United States Patent
Hurd

(10) Patent No.: US 11,110,866 B2
(45) Date of Patent: Sep. 7, 2021

(54) ADAPTABLE VEHICLE CARGO SYSTEM

(71) Applicant: HONDA MOTOR CO., LTD., Tokyo (JP)

(72) Inventor: Carter Jeffrey Hurd, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 16/579,650

(22) Filed: Sep. 23, 2019

(65) Prior Publication Data

US 2021/0086697 A1   Mar. 25, 2021

(51) Int. Cl.
*B60R 7/00* (2006.01)
*F15B 15/20* (2006.01)
*B60R 11/00* (2006.01)

(52) U.S. Cl.
CPC .............. *B60R 7/00* (2013.01); *F15B 15/20* (2013.01); *B60R 2011/0003* (2013.01); *B60R 2011/008* (2013.01); *B60R 2011/0075* (2013.01)

(58) Field of Classification Search
CPC .............. B60R 7/00; B60R 2011/0003; B60R 2011/0075; B60R 2011/008; F15B 15/20
See application file for complete search history.

(56) References Cited

U.S. PATENT DOCUMENTS

| | | | |
|---|---|---|---|
| 6,439,530 B1 | 8/2002 | Schoenfish et al. | |
| 7,997,554 B2 | 8/2011 | Carnevali | |
| 8,882,165 B2 | 11/2014 | Lipson et al. | |
| 9,764,220 B2 | 9/2017 | Keating et al. | |
| 2005/0011786 A1* | 1/2005 | Wood | F41C 33/06 206/315.11 |
| 2015/0107233 A1 | 4/2015 | Ou et al. | |
| 2015/0336227 A1 | 11/2015 | McKay et al. | |
| 2020/0191522 A1* | 6/2020 | Searle | A45C 13/008 |

FOREIGN PATENT DOCUMENTS

DE   102015225148 A1   6/2017
JP   2008528408 A   7/2008

OTHER PUBLICATIONS

Eric Brown, et al. "Universal robotic gripper based on the jamming of granular material." PNAS 2010.
Jifei Ou, et al. "jamSheets: Thin Interfaces with Tunable Stiffness Enabled by Layer Jamming." TEI 2014.

* cited by examiner

*Primary Examiner* — Corey N Skurdal
(74) *Attorney, Agent, or Firm* — Arent Fox LLP

(57) ABSTRACT

A vehicle cargo retaining apparatus and system having a first enclosure with an outer surface and an inner surface. The first enclosure is capable of containing a fluid within the first enclosure, such as to seal the fluid from an external atmosphere. The apparatus and system may further include a plurality of jamming members within the first enclosure and an opening in the enclosure for receiving or removing fluid. In one state, the plurality of jamming members are moveable relative to one another within the first enclosure when fluid is received via the opening allowing the outer surface of the first enclosure to be deformable. In a second state the plurality of jamming members are restricted from moving relative to one another within the first enclosure when fluid is removed via the opening causing the outer surface of the first enclosure to maintain a semi-rigid or rigid state. A control system may control operation of the system to enable the retaining operations.

20 Claims, 10 Drawing Sheets

ADAPTABLE VEHICLE CARGO SYSTEM

FIELD OF THE INVENTION

Aspects of the present disclosure relate generally to an apparatus for providing a cargo area having an adaptable surface for securing (also interchangeably referred to herein as retaining) an object within a vehicle. Specifically, aspects of the disclosure relate to providing a vehicle cargo area having a deformable, stiffness-tunable region that can be switched between a deformable and a shape-retaining state.

BACKGROUND

Drivers and passengers in vehicles may utilize storage compartments or interior surfaces to transport objects, such as luggage, groceries, or smaller cargo, e.g., as cell phones or the like. Movements of the vehicle may cause cargo within the vehicle to shift or otherwise move about the vehicle. Further, the shifting of cargo that may be fragile (e.g., eggs, fruits, golf clubs, electronics), may cause damage to objects and/or contents of the objects. While conventional devices (e.g., nettings, hooks, or boxes) may be used, they may not be sufficiently versatile in securing various objects having different shapes and sizes. Therefore, improvements to securing cargo within vehicle may be desired.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In accordance with another aspect of the disclosure, a vehicle cargo retaining apparatus is disclosed which may include a first enclosure with an outer surface and an inner surface. The first enclosure may be capable of sealing a fluid contained within the first enclosure from an outside atmosphere. The system may further include a plurality of jamming members within the first enclosure and an opening in the enclosure for receiving or removing fluid. In one state, the plurality of jamming members may be moveable relative to one another within the first enclosure when fluid is received via the opening, thereby allowing the outer surface of the first enclosure to be deformable. In a second state, the plurality of jamming members may be restricted from movement relative to one another within the first enclosure when fluid is removed via the opening, thereby causing the outer surface of the first enclosure to maintain a semi-rigid or rigid state.

In accordance with another aspect of the disclosure, a vehicle cargo retaining system or a vehicle with a cargo retaining system is disclosed. The system may include a fluid pump and a first enclosure having an outer surface and an inner surface, wherein the first enclosure is capable of sealing a fluid provided by the fluid pump within the first enclosure relative to an outside atmosphere. The enclosure may contain a plurality of jamming members. The first enclosure may have an opening in fluid communication with the pump for receiving or removing the fluid provided by the pump. In one state, the plurality of jamming members may be moveable relative to one another within the first enclosure when fluid is received via the opening, thereby allowing the outer surface of the first enclosure to be deformable. In a second state, the plurality of jamming members may be restricted from movement relative to one another within the first enclosure when fluid is removed via the opening, thereby causing the outer surface of the first enclosure to maintain a semi-rigid or rigid state.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

Figure 1:
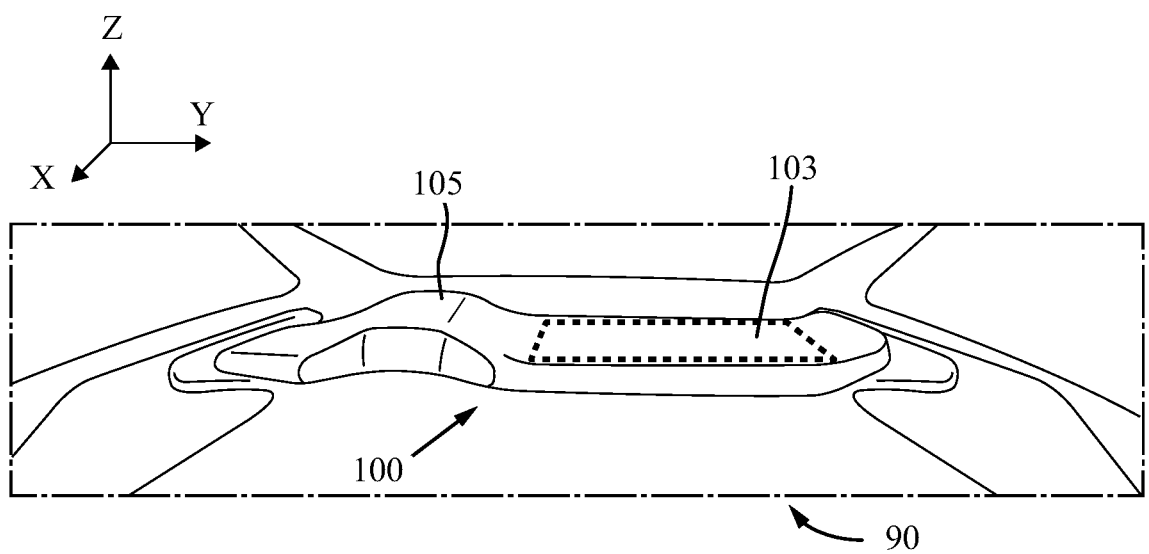
FIG. 1 illustrates front view of cargo area in accordance with one aspect of the disclosure.

The following includes definitions of selected terms employed herein. The definitions include various examples and/or forms of components that fall within the scope of a term and that may be used for implementation. The examples are not intended to be limiting.

The disclosure relates to an adaptable cargo area for a vehicle, the adaptable cargo area may, for example, be or include a surface or floor in a vehicle that is flexible and adaptable to cargo that may be placed on the cargo area. In one example, the cargo area may be or include a surface that is flexible and/or may become flexible. Once an object (e.g., cargo) is placed or pressed onto the surface, the surface may deform and at least partially take the shape of the cargo, such as due to the force of a user and/or gravity pressing the cargo into the surface when the surface is in a non-rigid state. Once the surface takes on or conforms to the shape of the cargo, the surface may be controlled to become rigid or semi-rigid in the altered state. Thus, even if the cargo is removed, for example, the surface may maintain the shape of the cargo, thereby allowing a user to remove and replace the cargo into a surface that is molded and held rigid or semi-rigid to the shape of the cargo. Thus, a cargo area is disclosed that can provide lateral support that prevents cargo from shifting or sliding within a vehicle, while still allowing the cargo area surface to be reset or returned to a desired default position when not being used to hold cargo.

The following includes further definitions of selected terms employed herein.

The term "surface" or "floor" may be used interchangeably herein and may refer to any surface in a vehicle.

The term "fluid," as used throughout the specification, may comprise any suitable gas, such as air for example, a liquid having any viscosity, or a fluid that is capable of changing phases from a liquid having a low viscosity to a liquid having a higher viscosity.

The term "cargo area" as used herein, may refer to any surface of vehicle that may be usable with the adaptable surface disclosed herein. For example, the term cargo area may refer to parcel shelf, a center console, a door console or shelf, a cup holder, rear trunk, a front trunk, a seat, a rear deck, and/or a floor of the passenger compartment of the vehicle, to name a few examples.

The term "processor," as used herein, may refer to a device that processes signals and performs general computing and arithmetic functions. Signals processed by the processor may include digital signals, data signals, computer instructions, processor instructions, messages, a bit, a bit stream, or other computing that can be received, transmitted and/or detected. A processor, for example, may include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "bus," as used herein, may refer to an interconnected architecture that is operably coupled so as to transfer data among computer components within a singular or multiple systems. The bus may be or include a memory bus, a memory controller, a peripheral bus, an external bus, a crossbar switch, and/or a local bus, among others. The bus may also be or include a vehicle bus that interconnects components inside a vehicle using protocols such as Controller Area network (CAN), Local Interconnect Network (LIN), among others.

The term "memory," as used herein, may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," or "signal communication" as used herein, may include a coupling by which entities are capable of exchanging information or providing and receiving current, in which signals, physical communications, and/or logical communications may be transmitted and/or received. An operable connection may include a physical interface, a data interface and/or an electrical interface.

The term "vehicle," as used herein, may refer to any moving or moveable vehicle that is capable of carrying one or more human occupants and is powered by an internal combustion engine and/or an electronic battery and/or any form of energy that may be recharged at a charging station. The term "vehicle" may include, but is not limited to: cars, trucks, vans, minivans, sport utility vehicles (SUVs), motorcycles, scooters, boats, personal watercraft, and aircraft. The term "vehicle" may include self-driving vehicles, hybrid vehicles, and electrical vehicles.

The term "system," or "vehicle system" as used herein, may refer to any electronically or otherwise controlled system on a vehicle or related to vehicle operation and may be operable to perform certain actions on components of the vehicle. For example, a system may provide an interface to allow operation by another system or graphical user interaction. The vehicle systems may include, but are not limited to, vehicle ignition systems, vehicle conditioning systems (e.g., systems that operate a windshield wiper motor, a windshield washer fluid motor or pump, a defroster motor, heating, ventilating, and air conditioning (HVAC) controls), vehicle audio systems, vehicle security systems, vehicle video systems, vehicle infotainment systems, vehicle telephone systems, fluid pumps (e.g., for controlling the rigidity and/or shape of an adaptable cargo surface), and the like.

Figure 2A:
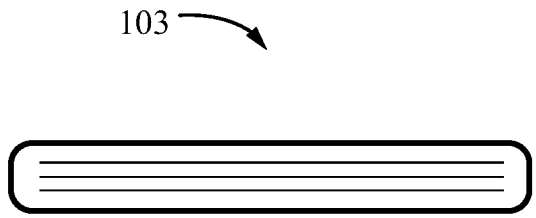
FIGS. 2A-D illustrate simplified cross sectional views of various states of an adaptable surface of a cargo area in accordance with one aspect of the disclosure.
Figure 2B:
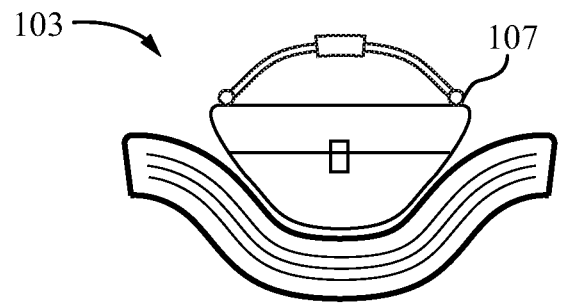

FIG. 1 representatively shows one example of an interior 90 of a vehicle having a cargo area 100 as a parcel shelf 103 within a portion of a dashboard 105, in accordance with aspects of the present disclosure. The parcel shelf 103, may for example be comprised of an adaptable surface. FIGS. 2A-2B, represent a broad overview of one example function of an adaptable surface of the parcel shelf 103 of FIG. 1. As shown in FIG. 2A, the adaptable surface of the parcel shelf 103 may be configured initially, for example, to take on a flat or default shape. In one example, the flat or default shape shown in FIG. 2A may be the shape of a conventional vehicle dash or parcel shelf, or portion thereof.

Figure 2C:
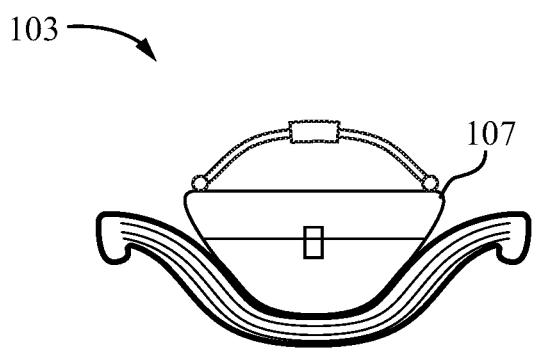

As shown in FIG. 2B, when a user places an object 107 or cargo on the parcel shelf 103, for example, the surface of the parcel shelf 103 may deform or may be controlled to deform to a shape that conforms to a portion of the object. As shown in FIG. 2C, once the object 107 is placed on the parcel shelf 103, the parcel shelf 103 may become rigid or semi-rigid in a second state, such that the parcel shelf 103 conforms to a bottom portion of object 107.

Figure 2D:
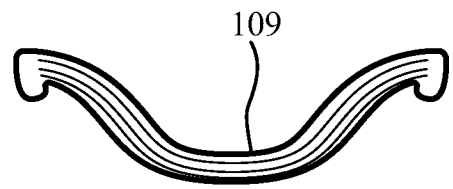

Further, as shown in FIG. 2D, once the object 107 (FIG. 2C) is removed, the parcel shelf may remain rigid or semi-rigid with a mold or portion 109 that conforms to the shape of the removed object 107. Thus, the parcel shelf 103 may be adaptable to at least partially or temporarily conform to and retain a shape that conforms to the surface of object 107, or any other object or cargo that may be placed on the parcel shelf 103.

Figure 3A:
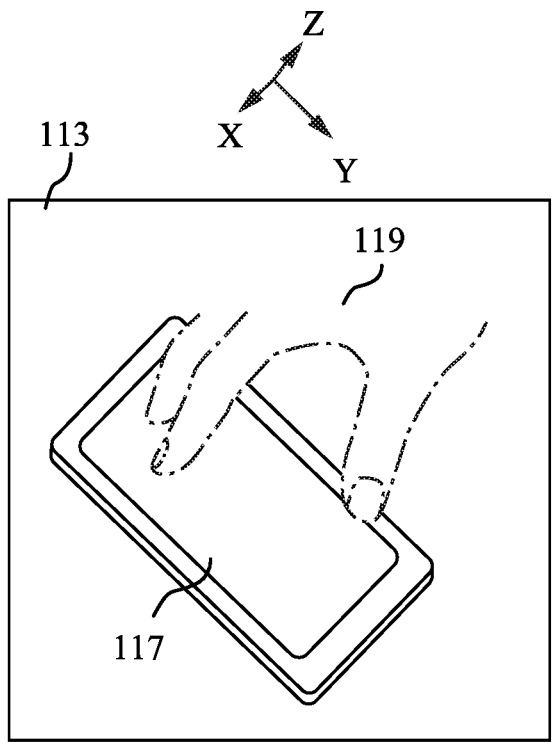
FIG. 3A-C illustrate top perspective views of various states of an adaptable surface in accordance with one aspect of the disclosure.
Figure 3B:
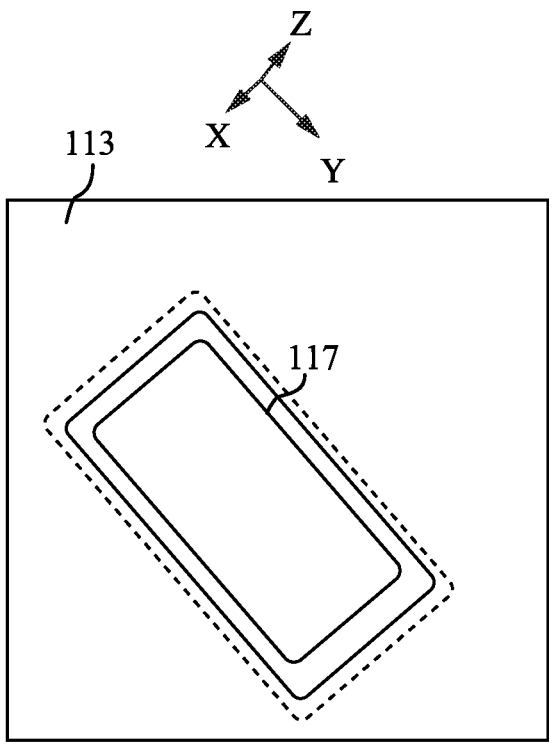
Figure 3C:
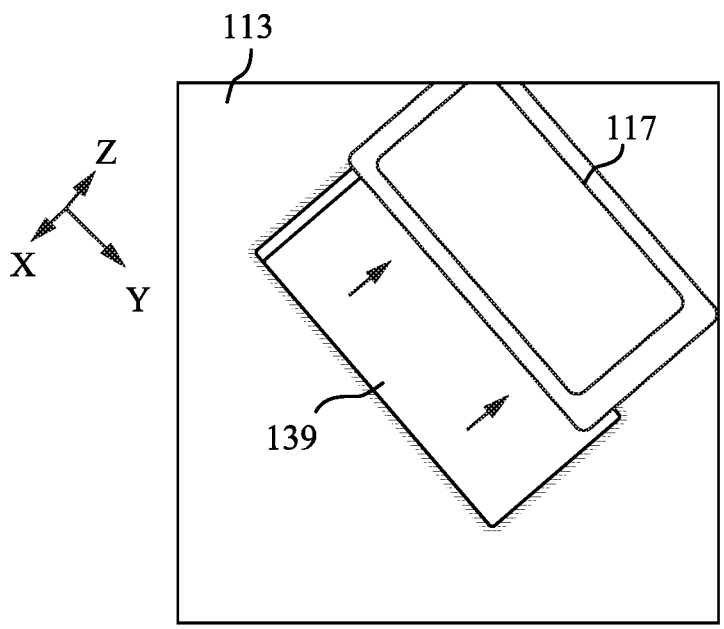

FIGS. 3A-C show another example of an interior surface of a vehicle having an adaptable surface in accordance with aspects of the present disclosure. As shown in FIG. 3A, a user 119 may, for example, place an object 117 (e.g., a mobile phone), onto adaptable surface 113. The adaptable surface 113 may conform or mold to one or more surface portions of the object 117, such as due to the weight of the phone and/or pressure applied by the user 119. Once surface 113 is molded to the surface shape of object 117, as shown in FIG. 3B, the surface may be controlled to become semi-rigid or rigid in a second state, such that a cavity 139 is formed therein that conforms to the corresponding portion(s) of the surface of the object 117. As shown in FIG. 3C, once the object 117 is removed, the surface 113 may remain rigid and include retaining cavity 139 that conforms to the shape of the removed object 117. Thus, the surface 113 may be adaptable to conform to and retain a shape that conforms to a surface portion of an object 117, thereby, among other things, providing a custom molded region that is capable of receiving and/or retaining the object 117.

The cargo area described above with reference to FIGS. 1-3 may further include various features for adding stability or additional effects to the moldable area, such additional features being interchangeably also referred to herein as "jamming" features and/or may constitute portions of a "jamming system." A jamming system in accordance with aspects of the present disclosure may include an arrangement and/or features in which multiple surfaces may be forced into contact with one another, for example due pressure or forces acting on the multiple surfaces. In one example, the multiple such surfaces may be contained within a flexible and/or semi-flexible enclosure. Removal of air and/or any other suitable fluid from the enclosure may cause the multiple surfaces to contact one another and/or for the friction and normal forces between the surfaces to increase and thus cause the surfaces to take on a rigid or semi-rigid state within the enclosure.

Figure 4A:
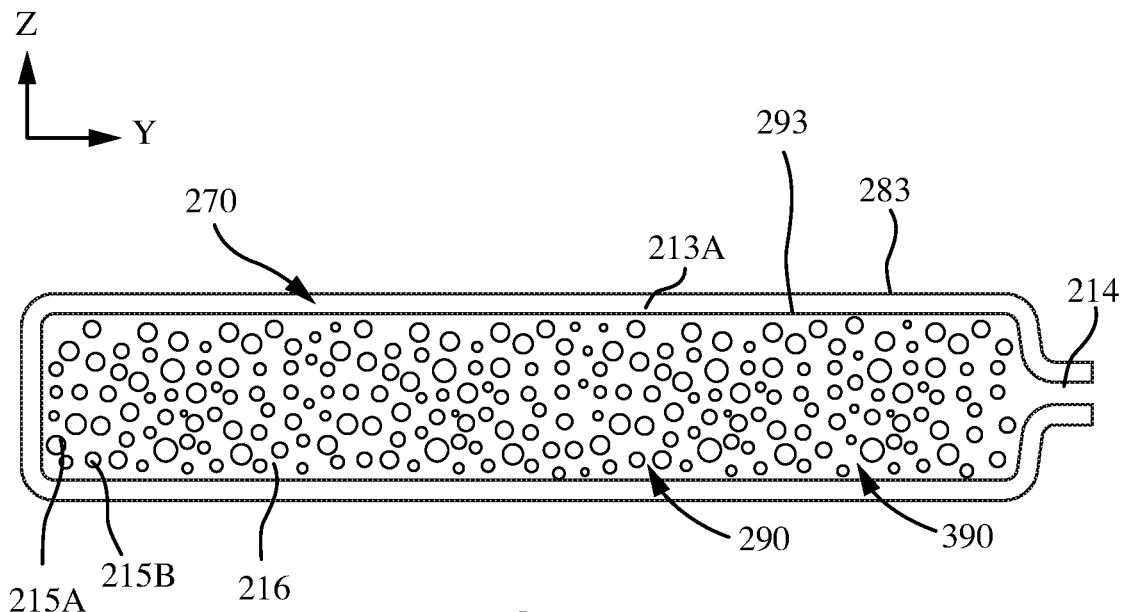
FIG. 4A-B illustrate simplified cross sectional views of various states of an adaptable surface of a cargo area in accordance with one aspect of the disclosure.
Figure 4B:
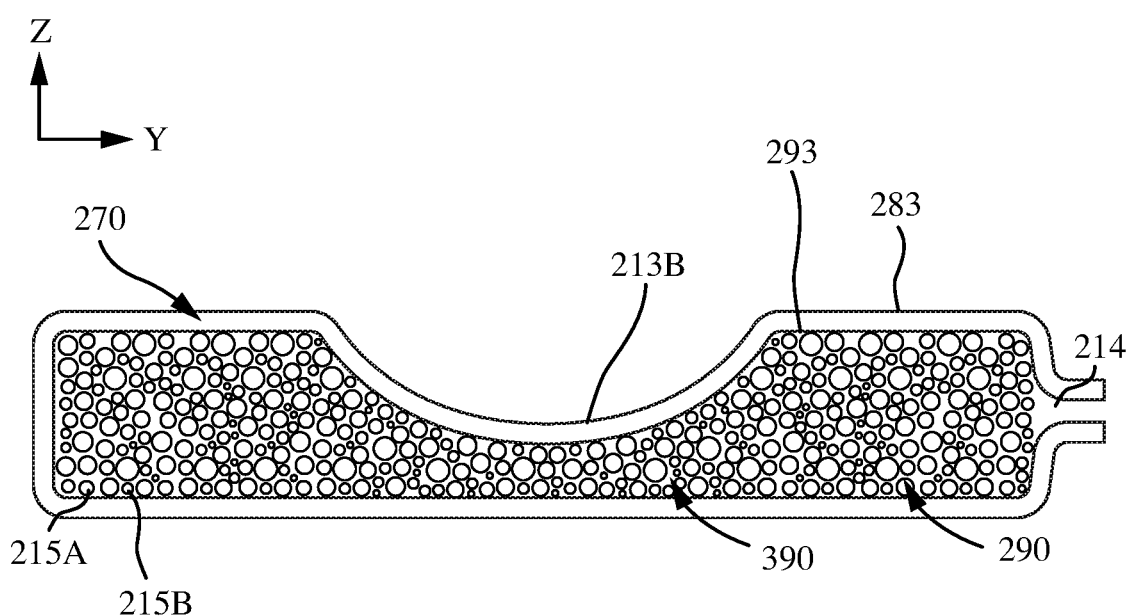

In one aspect of the disclosure, particle or granular features may comprise such jamming system, and such features may be used to control the rigidity of the surface (e.g., surface 113 of a vehicle cargo area). As shown in FIGS. 4A and 4B, in one example implementation, the cargo area may comprise a flexible enclosure 270 surrounding a jammable material 290 comprised of a plurality of granules or other closely spaced objects (e.g., 215A and 215B). In addition, the flexible enclosure 270 may further contain a fluid 390, which may occupy free space about the jammable material 290 within the enclosure 270. The amount of fluid within the flexible enclosure 270 may be controlled by supplying or removing fluid via opening 214. Using the aforementioned example features, the enclosure wall 213A, having an inner surface 293 and an outer surface 283, may be repeatedly reconfigured into different rigid shapes to conform to various items of cargo, for example. In all of the examples discussed throughout the disclosure, the flexible enclosure (e.g., 270) may for example have a surface in contact with a surface or floor of a vehicle, for example. In other aspects, the enclosure may be tethered or suspended within a vehicle with space below the enclosure (e.g., 270), which may for example allow for a greater degree of deformation of the enclosure and cargo area.

In one example, cargo area surface 113 may initially be placed in a first rigid shape, which may be or include a flat parcel shelf or dash of a vehicle (e.g., parcel shelf 103 in FIG. 1). If a user wishes to have the cargo area surface 113 conform to cargo or an object, for example, the density (and thus rigidity) of the jammable material (e.g., 215A and 215B) may be reduced until the enclosure wall 213A of the cargo area is flexible and deformable either under the weight of the cargo or object and/or due to a user pressing the cargo or object into the outer surface 283 of the enclosure wall 213A, for example. The weight of the cargo and/or the pressing of the cargo into enclosure wall 213A may cause the enclosure wall 213A of the cargo area to deform and the granular media (e.g., 215A and 215B) to re-arrange within the flexible enclosure 270 such that the enclosure wall 213A is reconfigured to have a include a shape portion 213B impressed therein. Once the desired shape is achieved, the air or other fluid 390 within the flexible enclosure may be removed, thereby causing the density and friction forces within the jammable material 290 to increase; this increase in friction forces and normal forces between individual granules of the jammable material 290 may in turn cause the rigidity of the overall structure to increase. At the end of the reconfiguration, the surface 213B may be rigid or semi-rigid and in the second shape as shown in FIG. 4B.

The enclosure wall 213A may retain or include the shape portion 213B until air or another fluid is provided to the flexible enclosure 270, at which point the shape portion 213B may either return to a default state (e.g., FIG. 4A) or may again be reconfigured in to a third shape, for example. For example, the granular media (e.g., 215A and 215B) within the flexible enclosure 270 may be jammed into a solid-like state after reconfiguration and removal of fluid 390, which may allow the enclosure 270 to continue to support and conform to various shapes and sizes of cargo or objects to which the shape portion 213B corresponds. In addition, the granular system and thus the enclosure wall 213A and outer surface 283 may be tuned in shape by controlling the "jamming pressure" via the removal of or addition of a fluid though opening 214 to attain a desired rigidity or a specific shape, for example.

In one example implementation along the lines discussed above, granules (e.g., granules 215A, 215B) may be employed as the Jammable material 290. The granular material 290, used in combination with a fluid 390 contained within a flexible or semi-flexible enclosure (e.g., enclosure 270), may allow the pressure acting on the granular material to be varied, including via effects impacting other forces, such as forces acting between and among individual granular particles (e.g., normal forces, friction, Van der Waal forces), so as to create a granular network system in accordance with aspects of the present disclosure that has tunable rigidity (such combination of impacting and impacted forces and materials being interchangeably referred to herein as "jamming pressure"). This jamming pressure may vary, for example, due to mechanical "squeezing" of the granules (e.g., 215A, 215B) relative to one another, which may be varied with differing in fluid pressure of the fluid received within flexible enclosure (e.g., 270). In accordance with the example described above, for example, a negative pressure provided via opening 214 may be used to reduce fluid pressure within the flexible enclosure 270 so as to enhance the jamming pressure and thus increase friction between and among the individual loose granular particles (e.g., granules 215A, 215B). Alternately, other types of jamming pressures (mechanical, positive fluid pressure) may be utilized. The mechanical properties of the jammed system may vary with the pressure applied to the granules (e.g., 215A and 215B) and the characteristics of the granules contained within the flexible enclosure 270, among other variables. For example, use of granules with irregular surfaces and high surface friction may result in a jammed system with higher rigidity (e.g., due to shape and frictional interactions of the granules). Conversely, the use of smoother granules may result in an adaptable enclosure wall 213A with a lower jammed strength (e.g., doe to less shape and/or frictional interactions of the granules), but such adaptable enclosure wall 213A may also deform more easily and thus result in an enclosure wall 213A and outer surface 283 that does not easily maintain its shape.

In some implementations in accordance with aspects of the present disclosure, the fluid inside the flexible enclosure 270 and the fluid outside the flexible enclosure 270 may each comprise air. However, other fluids and/or gels may also be used inside the flexible enclosure 270 to achieve similar or differing properties for the system. For example, a liquid (e.g., water) may be used to achieve higher fluid pressures, which may result in an increased system rigidity with some jammable material 290.

The aforementioned flexible enclosure 270 may comprise an outer surface 283 and an inner surface 293 and may be comprised of any suitable material that provides flexibility and that is sealed or otherwise separated from the external environment, so as to allow for a pressure differential between the outer environment and the inner fluid within the flexible enclosure 270. Some examples of materials that may be used to form the flexible enclosure 270 may include: a natural rubber or synthetic rubber, latex, an elastomer or elastomeric material, or a polyethylene, to name a few examples. Further, while various features of an example surface 213A and 213B are shown in FIGS. 4A and 4B, any suitable number of layers and/or other shapes or features may be provided to form the outer surface of surface 213 of the system and to provide various other advantages, such as suitable durability, improve flexibility, optimize the flexible enclosure's capability to return to a default state, and/or provide aesthetic appearance, to name a few examples.

Further, while only a single wall of flexible enclosure 270 is shown in FIGS. 4A and 4B, the deformable cargo area of the current disclosure may comprise a plurality of flexible enclosures and/or other flexible features that may be positioned in any suitable orientation with respect to one another. As described in further detail with respect to FIGS. 6A and 6B below, in one example of a jamming system in accordance with aspects of the current disclosure, multiple flexible enclosures (e.g., 270) may be provided that are interwoven with one another.

Figure 5A:
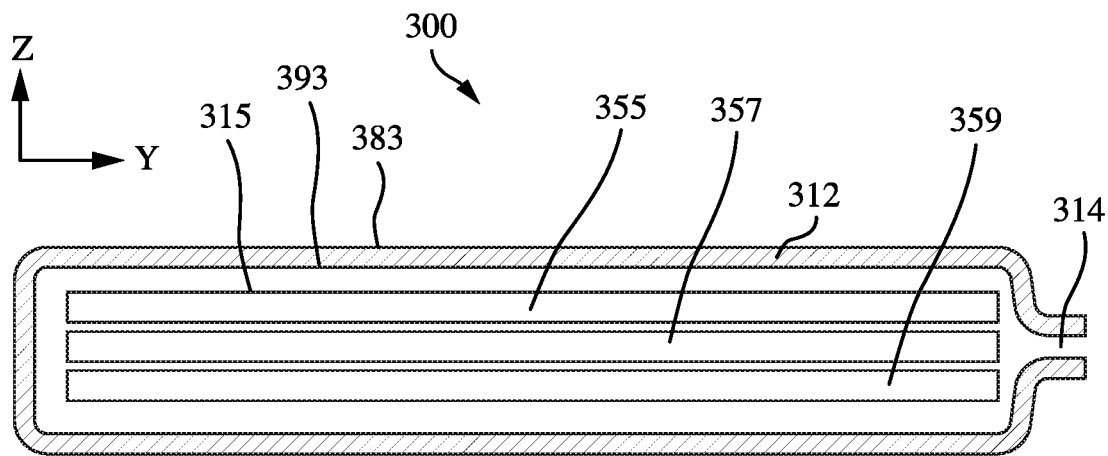
FIG. 5A-C illustrate simplified cross sectional views of various states of an adaptable surface of a cargo area in accordance with one aspect of the disclosure.
Figure 5B:
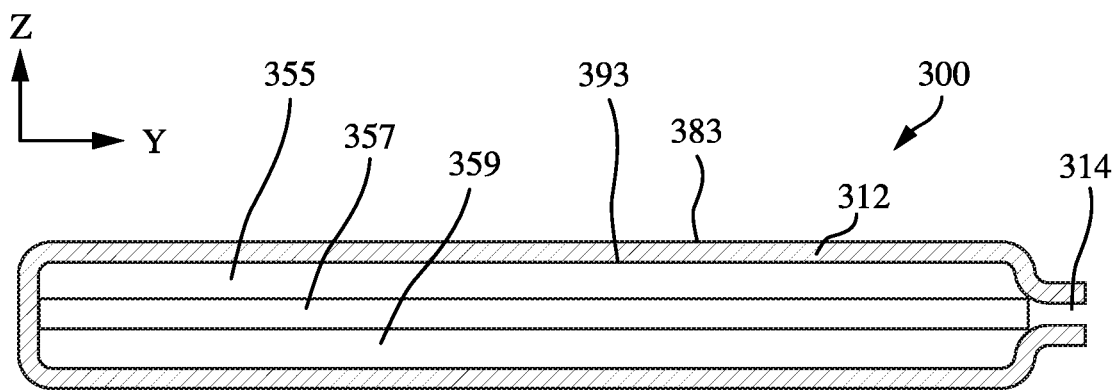
Figure 5C:
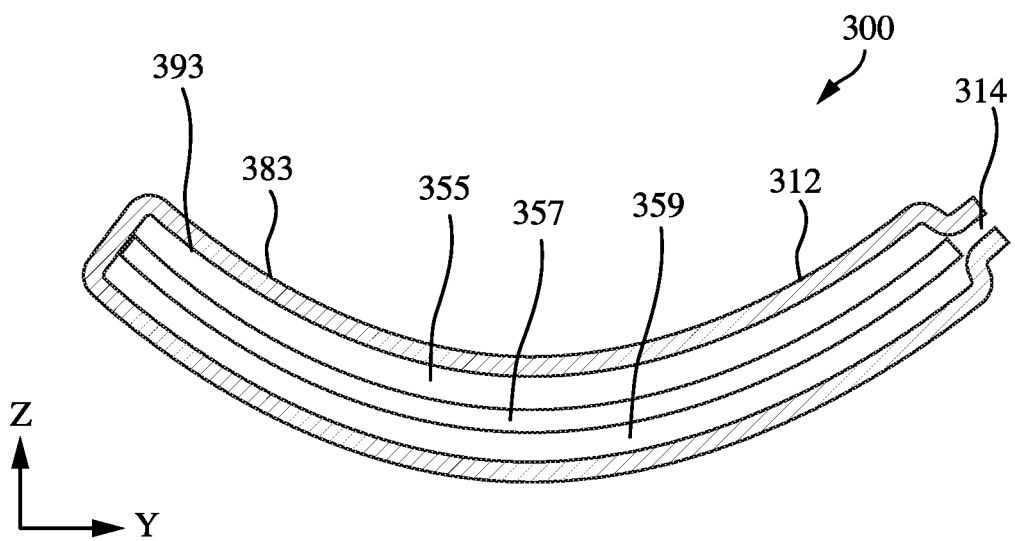

As shown in FIGS. 5A-5C, in some implementations, an enclosure 300 may include an enclosure wall 312 that includes both an outer surface 383, and inner surface 393 and one or more flexible sheets contained therein, which may, for example, be provided so as to allow a cargo area surface to deform while partially taking the shape of cargo other items emplaced thereon when the enclosure 300 is in a non-rigid state. Similarly to the implementation employing granules above, the enclosure wall 383 may transition to a more rigid state when air or other fluid is removed from the enclosure 300 via opening 314 to a flexible or transform into a more deformable state when air or other fluid is introduced into enclosure 300.

FIG. 5A shows one representative view of an example cross-section of a cargo area portion having a flexible enclosure 300 with an enclosure wall 312, which may hereinafter be interchangeable referred to as an outer wall, that includes an outer surface 383 and an inner surface 393 enclosing a cavity 315. The cavity 315 may contain a fluid and one or more flexible solid layers 355, 357, and 359, for example. An opening 314 may allow communication between the cavity 315 and a pump system (an example of which is described in further detail with respect to FIG. 7 below). The pump system may be used, for example, to selectively pump a fluid into or out of the cavity 315, and thereby to control the pressure of the fluid with the cavity 315 and resulting pressure that may be exerted by the outer surface 383 of enclosure 300 against layers 355, 357, and 359 in the cavity (e.g., if fluid pressure is reduced within the cavity 315). FIG. 5A shows one example enclosure wall 312 in a flexible or deformable state. Due to an increase in pressure from fluid within cavity 315, the inner walls or inner surface 393 of enclosure 300 and the surfaces of layers 355, 357, and/or 359 may be separated, and the layers 355, 357, 359 may be able to move freely relative to one another. Thus, the outer surface 383 of the cargo area in this state may be deformable and/or capable of molding and/or conforming to the shape of a portion of cargo or objects placed on outer surface 383.

FIG. 5B shows the example cargo area of FIG. 5A in a first rigid and/or semi-rigid shape. As shown in FIG. 5B, once all or a sufficient portion of fluid has been evacuated from the cavity, the wall of the enclosure 300 may contact one or more of the layers 355, 357, 359. As a result, the layers 355, 357, 359 may be compressed against one another, thereby, among other things, increasing friction between adjacent contacting layers 355, 357, 359. In the example shown in FIG. 5B, layers 355, 357, 359 may therefore interchangeably be referred to herein as "layer jammed" so as to form an overall rigid flat surface with the outer wall 312. While the layers 355, 357, 359 and the outer wall 312 may be layer jammed in the configuration shown in FIG. 5B, the layers 355, 357, 359 may remain subject to perpendicular forces and tension forces. In the layer-jammed state shown in FIG. 5B, the enclosure 300 in an overall flat surface configuration may remain rigid as long as the aforementioned forces are less than a force that required to cause slipping, shearing, inelastic deformation, and/or tearing of layers 355, 357, 359. In all of the examples discussed throughout the disclosure, the flexible enclosure (e.g., 300) may for example have a surface in contact with a surface or floor of a vehicle, for example. In other aspects, the enclosure may be tethered or suspended within a vehicle with space below the enclosure (e.g., 300), which may for example allow for a greater degree of deformation of the enclosure and cargo area.

As shown in FIG. 5C, the enclosure may further be configured to take on a second rigid shape from the aforementioned first rigid shape discussed with respect to FIG. 5A-5B above. For example, if a user places cargo or presses cargo or an object onto the rigid surface shown in FIG. 5B and wishes to have the cargo area outer surface 383 conform to cargo or an object, fluid may be added to enclosure 300 via opening 314 thus allowing layers 355, 357, and 359 to move relative to one another (e.g., as shown in FIG. 5A). The weight of the cargo and/or the pressing of the cargo into outer surface 383 may cause the outer wall 312 of the cargo area to deform and the layers 355, 357, and 359 to shift and/or contract and/or stretch relative to one another within the flexible enclosure 300 such that the surface is reconfigured to take on a second shape, one example of which is shown in FIG. 5C. Once the cargo area takes on the desired shape, the fluid may be removed via opening 314 causing layers 355, 357, 359 to be layer-jammed so as to form an overall rigid flat surface with the outer wall 312 in the second configuration shown in FIG. 5C. Likewise, if a user wishes for the outer surface 383 to return to a flat surface as shown in FIG. 5B for example. Fluid may be added to the enclosure 314 while the cargo or object is removed. The elasticity of the enclosure 300 and/or layers 355, 357, and 359 may cause the cargo area to return to a flat shape, at which point the fluid can be removed again to provide a cargo area with a flat surface as shown in FIG. 5B.

It is noted that FIGS. 5A-5C show three layers 355, 357, 359. However, the number of layers is not limited to three and may be any suitable number greater than one. Further, in order to prevent or reduce sheering or slipping of adjacent layers relative to one another, each layer may be comprised of or include a substrate layer that is coated with abrasive particles that are bonded to a substrate layer by an adhesive or molded into the substrate layer. The substrate layer may for example comprise paper, polymer impregnated paper, fiber, vulcanized fiber, cotton, polyester, rayon, or polyethylene terephthalate ("PET") film. The abrasive particles may, for example, comprise aluminum oxide, ceramic aluminum oxide, silicon carbide, aluminum oxide-zirconium oxide alloy, chromium III oxide, emery, garnet, or flint. In one example implementation, the aforementioned adhesive may comprise a resin (e.g., polyurethane or epoxy). Further, the abrasive particles may be packed and positioned so as to be contiguous to one another on the surface of the substrate, or alternatively may be separated from each other on the surface of the substrate. In some examples, the layers may comprise emery cloth, emery paper, and/or sandpaper.

Figure 6A:
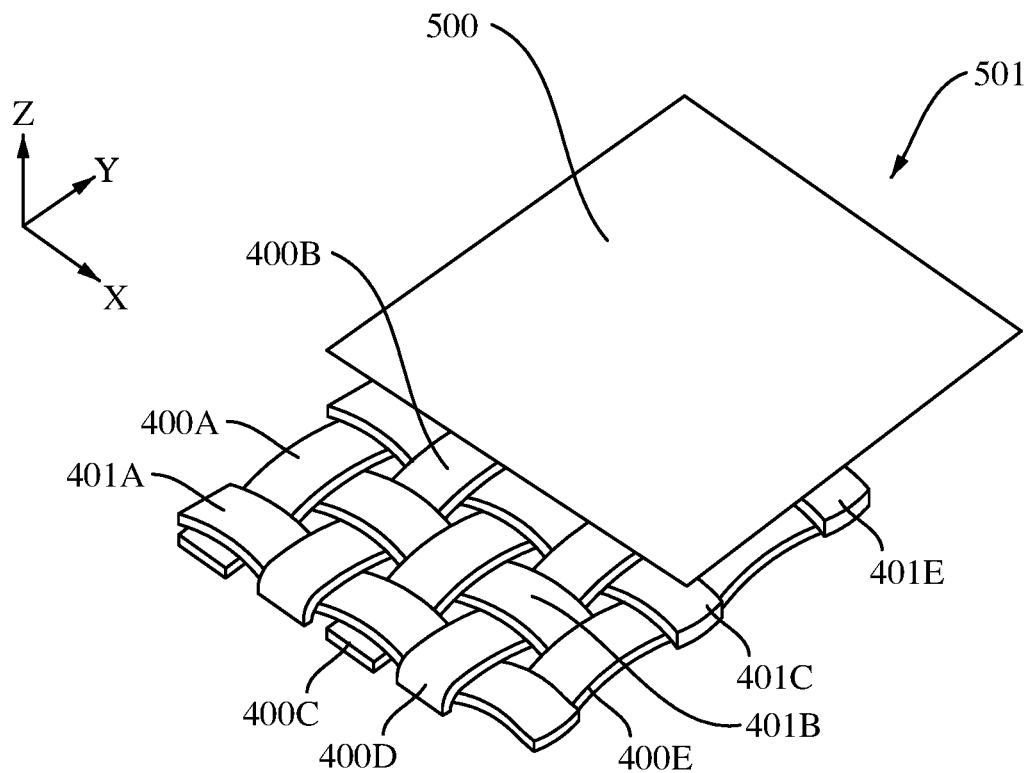
FIG. 6A illustrates a partial exploded view of an adaptable surface of a cargo area in accordance with one aspect of the disclosure.
Figure 6B:
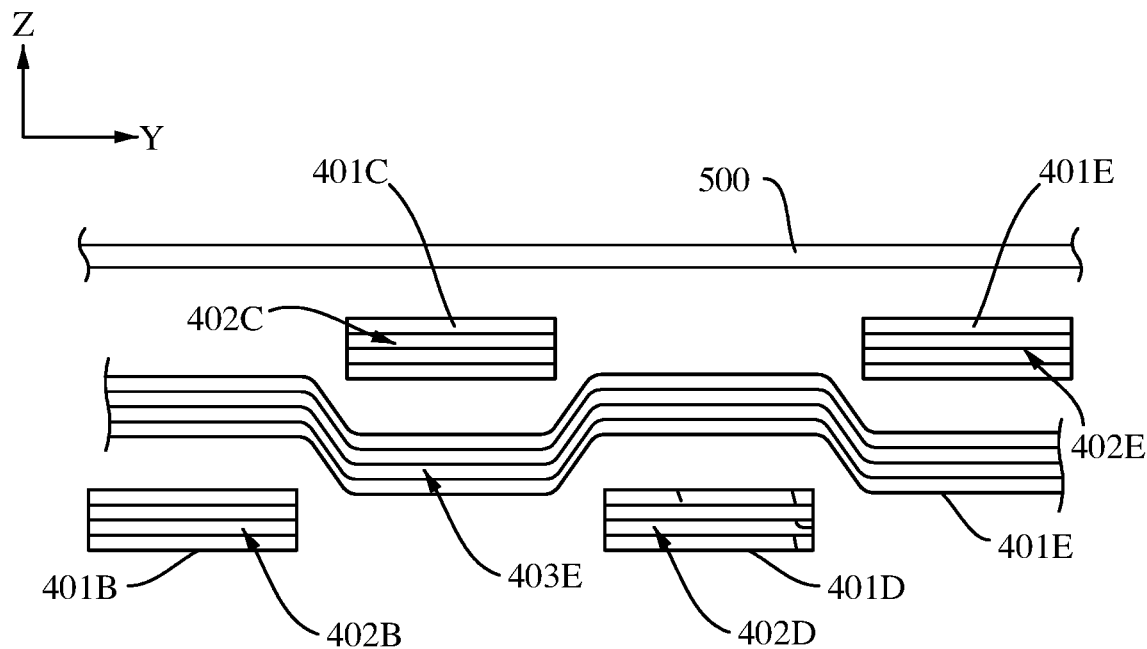
FIG. 6B illustrates a simplified cross sectional view of the adaptable surface of FIG. 6A in accordance with one aspect of the disclosure.

FIGS. 6A and 6B, show another example of a system in accordance with aspects of the present disclosure that includes two or more sets of enclosures, at least one of which may, for example, be similar to enclosure 300 (FIGS. 5A-C) and/or enclosure 270 (FIGS. 4A-B). In FIGS. 6A and 6B, multiple enclosures may be interwoven with each other and may jointly form a portion 501 of a cargo area of a vehicle. The portion 501 may further include a flexible or semi-flexible outer layer 500 for providing an outer surface of the cargo area portion 501. In one example, the outer layer 500 may be adhered to and/or encompass one or more additional interwoven enclosure portions 400A-E and/or 401A-E.

FIG. 6A shows an example perspective view of an example cargo area having ten interwoven enclosures. FIG. 6B shows a side cross-sectional view of several sets of the interwoven enclosures of FIG. 6A. It is noted that for simplicity purposes only a portion of a cargo area 501 is shown in FIGS. 6A-B and any suitable number of interwoven enclosures may be used for a particular implementation. Further, any of the enclosures 400A-E and 401A-E may comprise any of the jamming related features discussed with relation to FIGS. 4A-5C (e.g., granular jamming media or layers).

As shown in FIGS. 6A-B, a first set of enclosures may comprise a series of elongated enclosures 401A-E that may be aligned substantially parallel to each other. Each of the five elongated enclosures may comprise an opening (not shown), similar to openings 214 (FIGS. 4A-B) and/or 314 (FIGS. 5A-C) for the communication of fluid with each individual enclosure 401A-E. Thus, the rigidity and deformation of each individual enclosure may be varied by adding or removing fluid from each elongated enclosure 401A-E individually, for example. In another aspect, the first set of enclosures 401A-E may together form a single integral structure and optionally the cavity within each enclosure 401A-E may communicate with the cavity of each of the other enclosures 401A-E. The aforementioned implementation may provide a simplified structure in that on only a single pump may be necessary to remove or add fluid to all of the enclosures 401A-E.

Similarly, a second set of enclosures 400A-E may comprise a series of enclosures 400A-E that may be aligned substantially parallel to each other and interwoven or configured to overlap portions of the first set of enclosures 401A-E. Each of the second set of elongated enclosures may comprise an opening (not shown), similar to openings 214 (FIGS. 4A-B) and/or 314 (FIGS. 5A-C) for the transfer of fluid to each individual enclosure 400A-E. Similarly to enclosures 401A-E, the rigidity and deformation of each individual enclosure may be controlled by adding or removing fluid from each elongated enclosure 400A-E individually. In another aspect, the first set of enclosures may together form a single integral structure and share communication of their respective cavities, such that the cavity of each of the enclosures 400A-E communicates with all other cavities of the enclosures 400A-E.

As shown in FIG. 6B, each of the first set of enclosures and/or the second set of enclosures may comprise an inner cavity having one or more jammable layers (e.g., 402B-E, and 403E). In one aspect, any one of or a combination of enclosures 401A-E and/or 400A-E may include jamming layers therein along the lines as described in relation to FIGS. 5A-5C (e.g., 355, 357, and 359). While not shown in FIG. 6B, in another aspect, 401A-E and/or 400A-E may include a jammable granular media therein along the lines as described in relation to FIGS. 4A-4B (e.g., 215A and 215B). Further it is noted that any combination of jamming features described may be used. For example, in one aspect a first enclosure 400A may include jamming layers (e.g., along the lines of layers 355, 357, and 359 in FIGS. 5A-C) and a second enclosure 401A may include jamming media (e.g., along the lines of media 215A and 215B in FIGS. 4A-4B).

Figure 7:
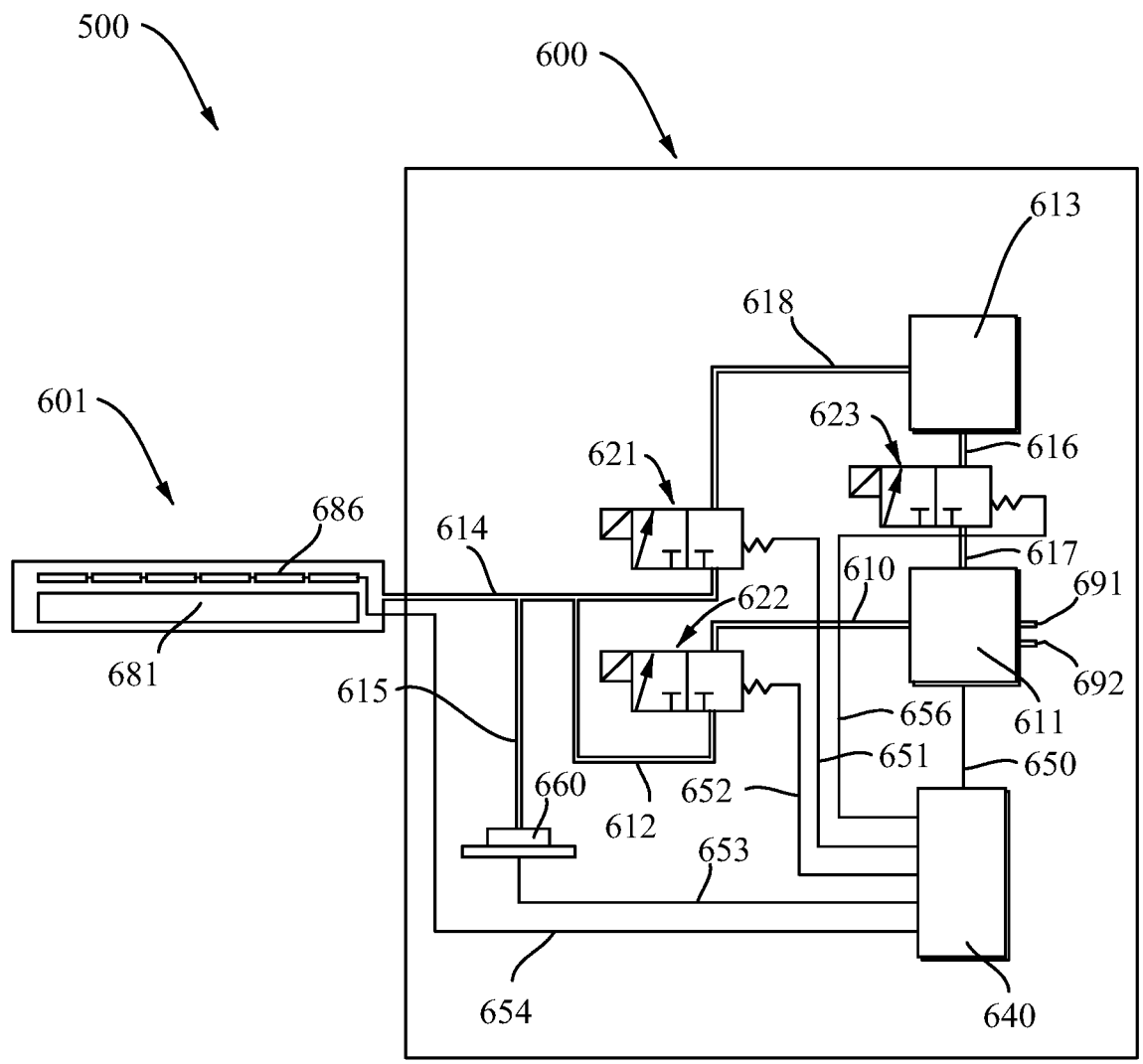
FIG. 7 illustrates an example of a system for controlling an adaptable surface of a cargo area in accordance with one aspect of the disclosure.

FIG. 7 shows a representative diagram of one example implementation of an adaptable cargo system 500 having a fluid control system 600 for removing or providing fluid to an enclosure or series of enclosures 681 for selectively transitioning a cargo area between a moveable or deformable state and a rigid state. In one example implementation, the system may include a detector or series of detectors 686 that may be located within the enclosure or series of enclosures 681, or alternately, in or on the outer wall of the enclosure 681. In an illustrative example, the detector or series of detectors may be located between an enclosure 681 and an outer surface of the cargo area (e.g., outer layer 500 in FIG. 6A). The detectors or series of detectors 686 may comprise bend sensors and/or pressure sensors. The detectors 686 may provide an output signal when the outer surface of cargo area retaining feature 601 is bent, deformed (e.g., by a human manipulation), such as when cargo is placed on a cargo area surface, for example. The output from detectors 686 may be communicated via a wire, wireless, optical, or other form of signal communication to a controller 640. Based on the output from the detectors 686, the controller 640 may determine whether and how much fluid to add to or remove from the enclosure 681, for example.

As shown in FIG. 7, the system 500 may include a fluid control system 600 that controls the pressure of a fluid within enclosure 681. The fluid control system 600 may include a pump 611, valves 621, 622, 623, and communication passages 610, 612, 614, 615, 616, 617, and 618. The system may further comprise a chamber 613 for storage of fluid. The system may further include at least one pressure sensor 660, a controller 640, and communication paths 650, 651, 652, 653, 654, and 656. In operation, when the cargo area retaining feature 601 is determined, for example, on the basis of input from detector 686 to be in condition to be transitioned from a rigid to a deformable state, valves 622 and 623 may be controlled to allow the passage of fluid to the enclosure 681, and valve 621 may be shut to block the passage of fluid back to the storage area 613. The pump 611 may then provide fluid through passages 610, 612, and 614 to enclosure 681.

To remove fluid from the enclosure 681, e.g., to transition the cargo area retaining feature 601 from the deformable state to a rigid state, the pump 611 may be reversed with valve 621 shut to block the flow of fluid and valves 622 and 623 opened to allow the passage of fluid back to chamber 613. The pump 611 may pull fluid through passages 610, 612, and 614 out of the enclosure 681 and through passages 617 and 616 to chamber 613.

Alternatively, the enclosure 681 may be deflated quickly by controlling valve 622 to be closed so as to prevent the flow of fluid and opening valve 621, thus causing fluid to quickly rush out of enclosure 681 through passages 614 and 615 into the chamber 613. To create a negative pressure and/or vacuum in the chamber 613 (e.g., to empty enclosure 681 quickly), valve 621 may initially be controlled to block the flow of fluid, valve 623 may be controlled to be opened, and the fluid may thereby be evacuated out of the chamber 613 through passages 616, 617 by the pump 611. The pump 611 may include at least one port 691 through which fluid is drawn into the pump 611 from the external atmosphere (e.g., in the case of air being used as the fluid) or a reservoir (e.g., if a specific gas or liquid is used as the fluid). The pump 611 may further include a fluid exit port 692 through which fluid may be pumped out of the pump 611 into the external atmosphere (e.g., in the case of air being used) or the aforementioned reservoir (e.g., if a specific gas or liquid is used as the fluid).

As further shown in the example implementation of FIG. 7, a pressure sensor 660 may be in fluid communication with the enclosure 681 via passages 614 and 615. Thus, the pressure sensor 660 may be used to detect a fluid pressure inside reservoir 681. The controller 640 may be in signal communication with the pump 611 and the sensor 660. The controller 640 may further be configured to be in signal communication with and to output a signal to valves 621, 622, 623, so as to cause the valves 621, 622, 623 to selectively open or close. In the example operations described above, the controller 611 may be configured to selectively transmit signals to control the pump 611 and the valves 621, 622, 623 for purposes of carrying out those operations. Further, the controller 640 may be configured to receive data that is indicative of the pump operational state and the operational state of each valve. Also, for example, the controller 640 may receive pressure data from the pressure sensor 660.

Figure 8:
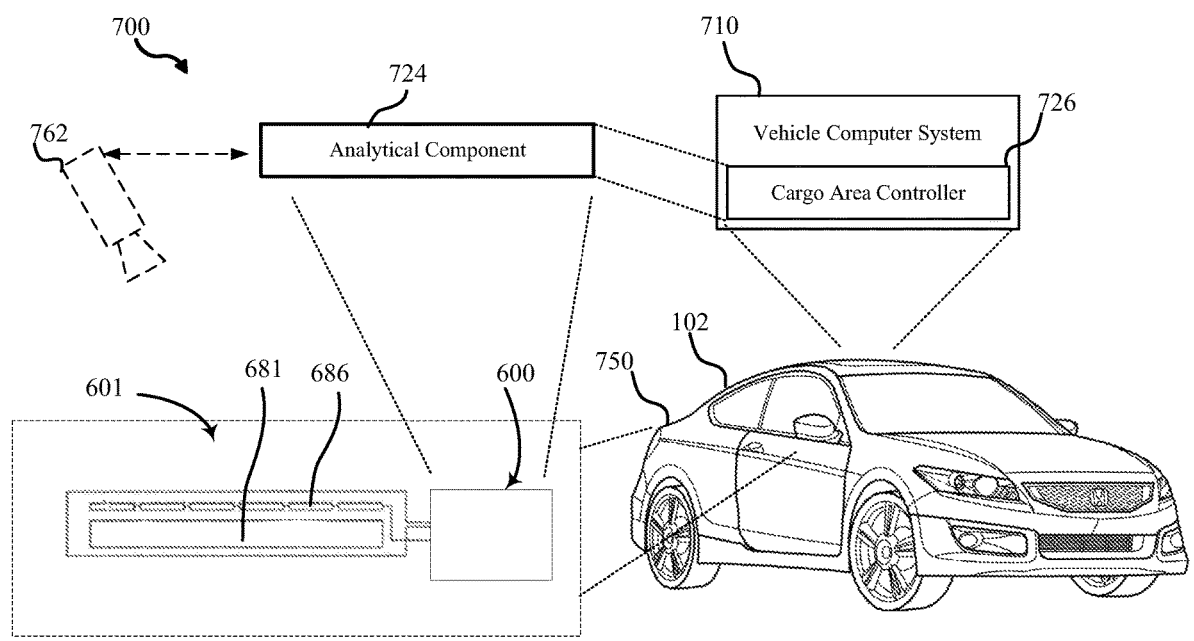
FIG. 8 illustrates an example of a system for controlling an adaptable surface of a cargo area in accordance with one aspect of the disclosure.

Turning now to FIG. 8, In some implementations, the vehicle 102 may include a cargo area controller 726 having an analytical component 724, for example. The vehicle 702 may include a cargo area retaining feature 601, which may for example include the jamming components described with relation to FIGS. 4A-7 above. The cargo area retaining feature 601 may for example be capable of receiving cargo, such as an object (e.g., object 107 or 117, as shown in FIGS. 2A-3C). In one example, the vehicle may further include a detector 762 (e.g., one or more visible light cameras and/or infrared cameras, radio-frequency identification (RFID) sensors, acoustic sensors, electromagnetic sensors), and/or a single or series of pressure and/or bend detectors 686.

In some implementations, during normal operations of the vehicle 102, a user may place the cargo, such as an object (e.g., object 107 or 117, as shown in FIGS. 2A-3C) onto the surface of the cargo area retaining feature 601. The detector 762 may capture images of the storage compartment retaining feature 601, for example, and transmit the captured images to the analytical component 724 of the cargo area controller 726. The analytical component 724 may dynamically determine (based on the captured images) the presence of the object. In some example implementations, the analytical component 724 may determine an edge of the object and/or the region of the storage compartment retaining feature 601 covered by the object. The analytical component 724 may determine another region of the storage compartment retaining feature 601 not covered by the object. The analytical component 724 may then determine how much fluid to provide or remove from enclosure 681 or from each of a plurality of enclosures (e.g., enclosures 400A-E, 401A-E, as shown in FIGS. 6A-B) so as to secure the object.

In one non-limiting example, the analytical component 724 may determine that cargo, such as an object, has been placed on storage compartment retaining feature 601, may instruct the fluid control system 600 to provide fluid to the enclosure 681 or all of or a subset of enclosures (e.g., enclosures 400A-E, 401A-E, as shown in FIG. 6A-B) so as to allow the surface of storage area retaining feature 601 to deform and conform to the borders of the cargo. Based on output from the detector 762 and/or one or more of detectors 686, the analytical component 724 may determine that the surface of storage area retaining feature 601 has sufficiently conformed to the cargo and may instruct the fluid control system 600 to remove fluid from enclosure 681, thereby causing the storage area retaining feature 601 to become rigid in the conformed state. Conversely, once the analytical component 724 determines that the cargo is removed from the storage area retaining feature 601, based on an output from the detector 762 and/or one or more detectors 686, the analytical component 724 may provide instructions to the fluid control system 600 to provide fluid to chamber 681. If no cargo is provided to the cargo area 601 when fluid is provided to chamber 681, the cargo area 601 may return to a default state, at which point the analytical component 724 may instruct the fluid control system 600 to remove fluid from enclosure 681 so that the cargo area 601 becomes rigid in a default state.

In another aspect, a user of a vehicle may provide instructions via switches knobs, and/or a vehicle graphical user interface (GUI) to control any one of or all of the aforementioned states of the vehicle cargo area.

Figure 9:
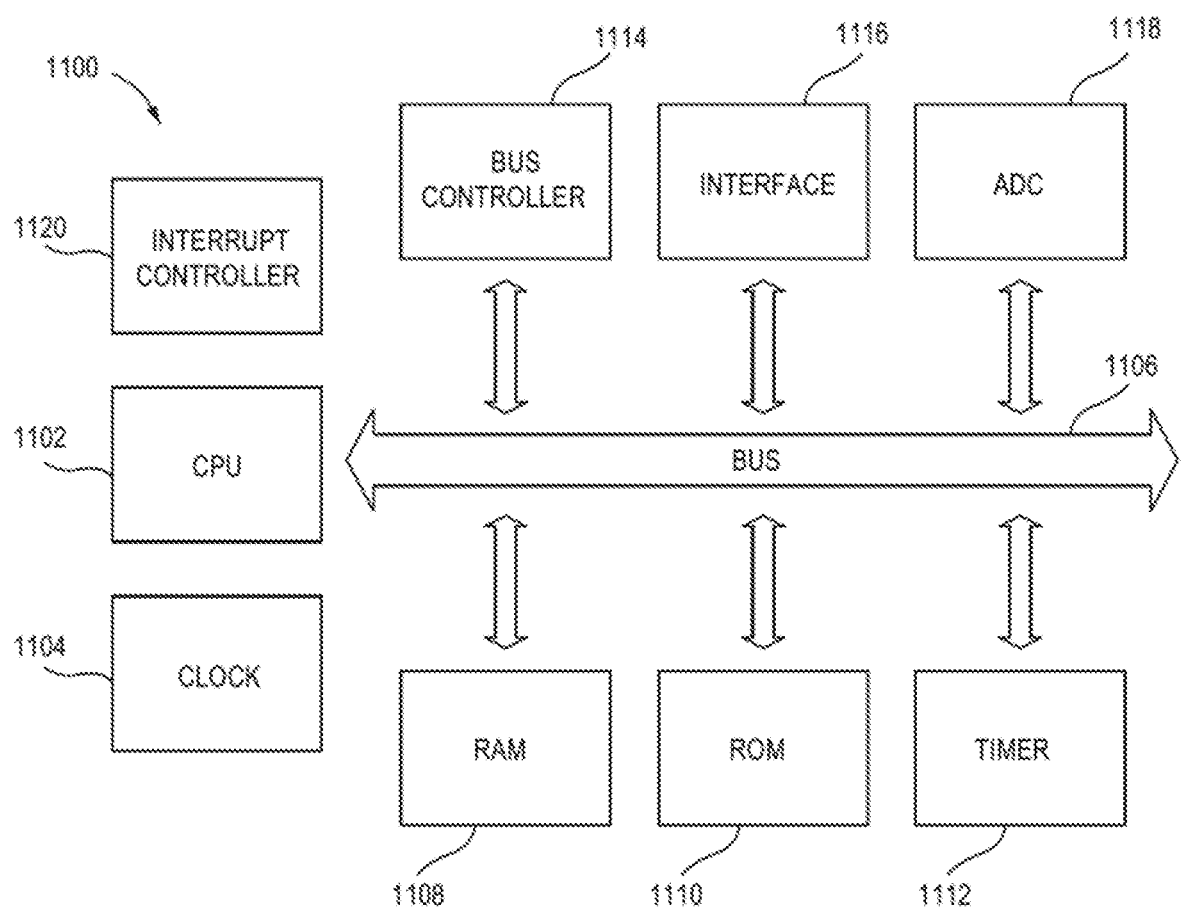
FIG. 9 illustrates an example representative diagram of various components of an example controller for use in accordance with an aspect of the disclosure.

In some implementations, as part of or incorporating various features described herein, one or more microcontrollers may be implemented (e.g., in fluid control system 600, analytical component 724, or cargo area controller 726) for carrying out various operations in accordance with aspects of the present invention. Various components of such a controller 1100 are shown in representative block diagram form in FIG. 9. In FIG. 9, the controller 1100 includes a CPU 1102, clock 1104, RAM 1108, ROM 1110, a timer 1112, a BUS controller 1114, an interface 1116, and an analog-to-digital converter (ADC) 1118 interconnected via a BUS 1106.

The CPU 1102 may be implemented as one or more single core or multi-core processors, and receive signals from an interrupt controller 1120 and a clock 1104. The clock 1104 may set the operating frequency of the entire microcontroller 1100 and may include one or more crystal oscillators having predetermined frequencies. Alternatively, the clock 1104 may receive an external clock signal. The interrupt controller 1120 may also send interrupt signals to the CPU, to suspend CPU operations. The interrupt controller 1120 may transmit an interrupt signal to the CPU when an event requires immediate CPU attention.

The RAM 1108 may include one or more Static Random Access Memory (SRAM), Dynamic Random Access Memory (DRAM), Synchronous Dynamic Random Access Memory (SDRAM), Double Data-Rate Random Access Memory (DDR SDRAM), or other suitable volatile memory. The Read-only Memory (ROM) 1110 may include one or more Programmable Read-only Memory (PROM), Erasable Programmable Read-only Memory (EPROM), Electronically Erasable Programmable Read-only memory (EEPROM), flash memory, or other types of non-volatile memory.

The timer 1112 may keep time and/or calculate the amount of time between events occurring within the controller 1100, count the number of events, and/or generate baud rate for communication transfer. The BUS controller 1114 may prioritize BUS usage within the controller 1100. The ADC 1118 may allow the controller 1100 to send out pulses to signal other devices.

The interface 1116 may comprise an input/output device that allows the controller 1100 to exchange information with other devices. In some implementations, the interface 1116 may include one or more of a parallel port, a serial port, or other computer interfaces.

Figure 10:
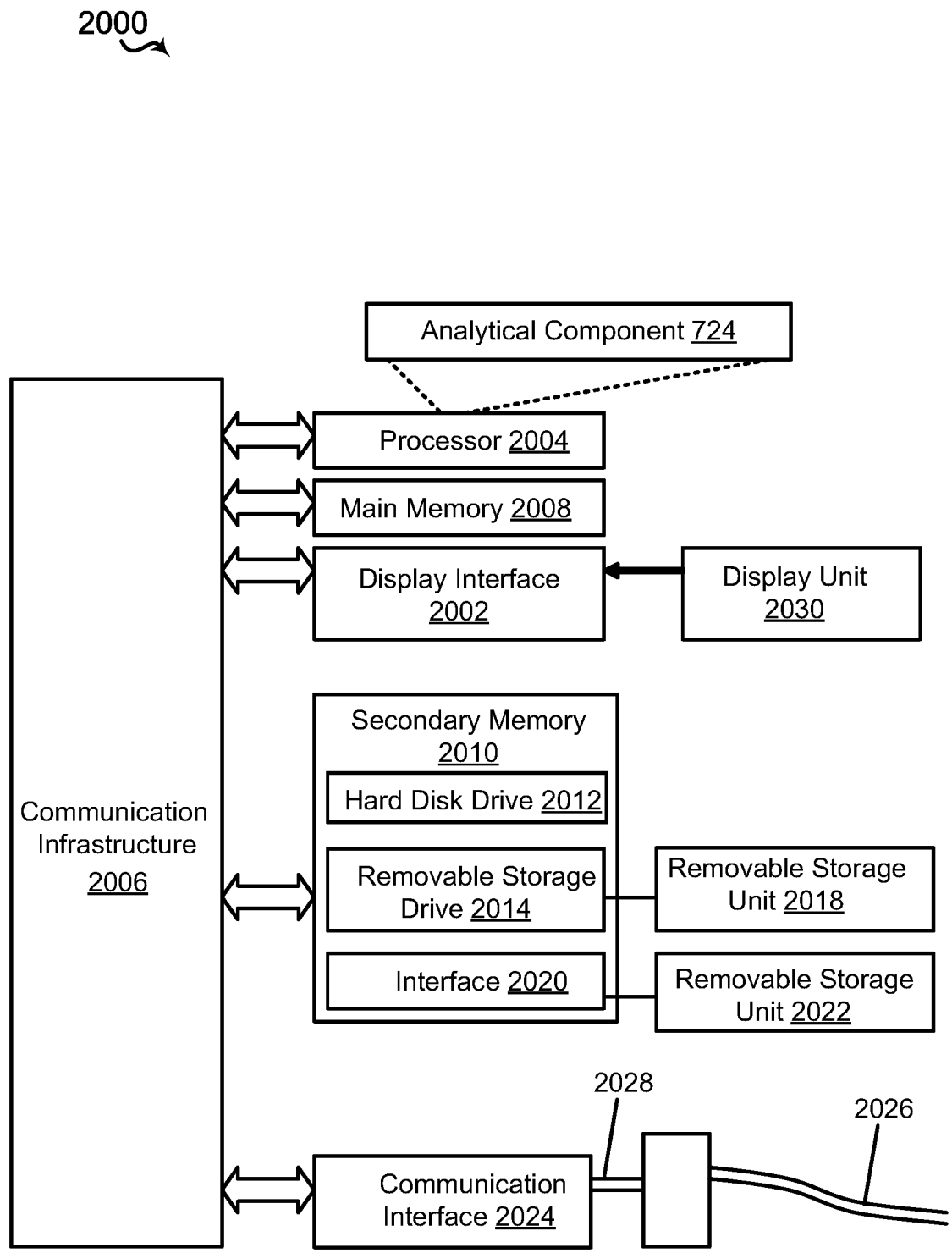
FIG. 10 illustrates an example of a computer system in accordance with aspects of the present disclosure.

In addition, aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 2000 is shown in FIG. 10.

The computer system 2000 may include one or more processors, such as processor 2004. The processor 2004 may be connected to a communication infrastructure 2006 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 2000 may include a display interface 2002 that forwards graphics, text, and other data from the communication infrastructure 2006 (or from a frame buffer not shown) for display on a display unit 2030. Computer system 2000 also includes a main memory 2008, preferably random access memory (RAM), and may also include a secondary memory 2010. The secondary memory 2010 may include, for example, a hard disk drive 2012, and/or a removable storage drive 2014, representing a floppy disk drive, a magnetic tape drive, an optical disk drive, a universal serial bus (USB) flash drive, etc. The removable storage drive 2014 reads from and/or writes to a removable storage unit 2018 in a well-known manner. Removable storage unit 2018 represents a floppy disk, magnetic tape, optical disk, USB flash drive etc., which is read by and written to removable storage drive 2014. As will be appreciated, the removable storage unit 2018 includes a computer usable storage medium having stored therein computer software and/or data.

Alternative aspects of the present disclosure may include secondary memory 2010 and may include other similar devices for allowing computer programs or other instructions to be loaded into computer system 2000. Such devices may include, for example, a removable storage unit 2022 and an interface 2020. Examples of such may include a program cartridge and cartridge interface (such as that found in video game devices), a removable memory chip (such as an erasable programmable read only memory (EPROM), or programmable read only memory (PROM)) and associated socket, and other removable storage units 2022 and interfaces 2020, which allow software and data to be transferred from the removable storage unit 2022 to computer system 2000.

Computer system 2000 may also include a communications interface 2024. Communications interface 2024 allows software and data to be transferred between computer system 2000 and external devices. Examples of communications interface 2024 may include a modem, a network interface (such as an Ethernet card), a communications port, a Personal Computer Memory Card International Association (PCMCIA) slot and card, etc. Software and data transferred via communications interface 2024 are in the form of signals 2028, which may be electronic, electromagnetic, optical or other signals capable of being received by communications interface 2024. These signals 2028 are provided to communications interface 2024 via a communications path (e.g., channel) 2026. This path 2026 carries signals 2028 and may be implemented using wire or cable, fiber optics, a telephone line, a cellular link, an RF link and/or other communications channels. In this document, the terms "computer program medium" and "computer usable medium" are used to refer generally to media such as a removable storage drive 2018, a hard disk installed in hard disk drive 2012, and signals 2028. These computer program products provide software to the computer system 2000. Aspects of the present disclosures are directed to such computer program products.

Computer programs (also referred to as computer control logic) are stored in main memory 2008 and/or secondary memory 2010. Computer programs may also be received via communications interface 2024. Such computer programs, when executed, enable the computer system 2000 to perform the features in accordance with aspects of the present disclosures, as discussed herein. In particular, the computer programs, when executed, enable the processor 2004 to perform the features in accordance with aspects of the present disclosures. Accordingly, such computer programs represent controllers of the computer system 2000.

In an aspect of the present disclosures where the method is implemented using software, the software may be stored in a computer program product and loaded into computer system 2000 using removable storage drive 2014, hard drive 2012, or communications interface 2020. The control logic (software), when executed by the processor 2004, causes the processor 2004 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

Figure 11:
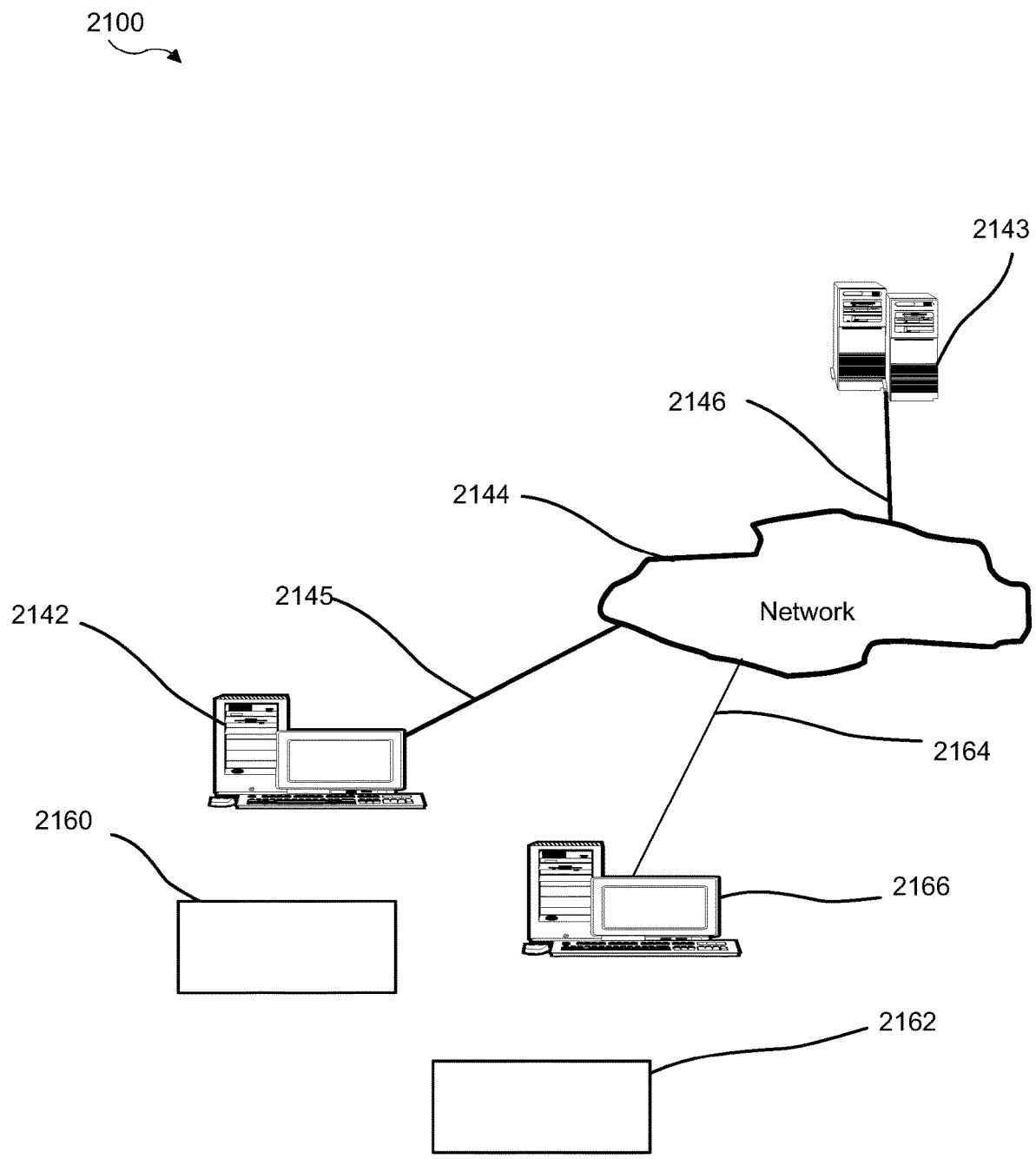
FIG. 11 illustrates a diagram of various exemplary system components in accordance with aspects of the present disclosure.

FIG. 11 is a block diagram of various example communication system components usable in accordance with an aspect of the present disclosure. The communication system 2100 includes one or more accessors 2160, 2162 (which may for example comprise any of the aforementioned systems and features) and one or more terminals 2142, 2166. In one aspect, data for use in accordance with aspects of the present disclosure is, for example, input and/or accessed by accessors 2160, 2162 via terminals 2142, 2166, such as personal computers (PCs), minicomputers, mainframe computers, microcomputers, telephonic devices, or wireless devices, such as personal digital assistants ("PDAs") or a hand-held wireless devices coupled to a server 2143, such as a PC, minicomputer, mainframe computer, microcomputer, or other device having a processor and a repository for data and/or connection to a repository for data, via, for example, a network 2144, such as the Internet or an intranet, and couplings 2145, 2146, 2164. The couplings 2145, 2146, 2164 include, for example, wired, wireless, or fiberoptic links. In another example variation, the method and system in accordance with aspects of the present disclosure operate in a stand-alone environment, such as on a single terminal.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A vehicle cargo retaining apparatus, comprising:
    a first enclosure having an outer surface and an inner surface, wherein the first enclosure is capable of containing a fluid;
    a first jamming member comprising a plurality of sheets forming layers within the first enclosure; and
    an opening for receiving or removing the fluid, wherein the first jamming member is moveable relative to the first enclosure when fluid is received via the opening so as to allow the outer surface of the first enclosure to be deformable; and
    wherein the first jamming member is impeded from movement relative to the first enclosure when fluid is removed via the opening so as to cause the outer surface of the first enclosure to maintain a semi-rigid or rigid state.

2. The apparatus of claim 1, further comprising:
    a pump for removing or providing fluid to the first enclosure via the opening.

3. The apparatus of claim 2, wherein the pump adds fluid to the enclosure in response to a signal that corresponds with an object being placed on the enclosure; and
    the pump removes fluid from the enclosure in response to a signal that corresponds with the deformation of the enclosure due to the object being placed on the enclosure.

4. The apparatus of claim 1, wherein the retaining apparatus further comprises:
    a second enclosure having an outer surface and an inner surface, wherein the second enclosure contains a plurality of jamming members and is capable of sealing a fluid contained within the second enclosure from an outside atmosphere, wherein at least a portion of the outer surface of the second enclosure overlaps at least a portion of the outer surface of the first enclosure.

5. The apparatus of claim 1, further comprising:
    a second enclosure having a second enclosure outer surface and a second enclosure inner surface, wherein the second enclosure is capable of containing a fluid;
    a second jamming member within the second enclosure, wherein the second jamming member is formed of a material that is different from the first jamming member.

6. A vehicle cargo retaining system, comprising:
    a fluid pump;
    a first enclosure either forming a surface within the vehicle or rigidly mounted to a surface of the vehicle and having an outer surface and an inner surface, wherein the first enclosure is capable of containing a fluid provided by the fluid pump;
    a plurality of jamming members within the first enclosure; and
    an opening in fluid communication with the pump for receiving or removing the fluid provided by the pump, wherein the plurality of jamming members are moveable relative to one another within the first enclosure when fluid is received via the opening allowing the outer surface of the first enclosure to be deformable; and wherein the plurality of jamming members are restricted from movement relative to one another within the first enclosure when fluid is removed via the opening causing the outer surface of the first enclosure to maintain a semi-rigid or rigid state.

7. The system of claim 6, wherein the plurality of jamming members are a granular media.

8. The system of claim 6, wherein the plurality of jamming members are a series of sheets forming layers within the first enclosure.

9. The system of claim 6, further comprising a pump for removing or providing fluid to the first enclosure via the opening.

10. The system of claim 9, wherein the pump adds fluid to the enclosure in response to a signal that corresponds with an object being placed on the enclosure; and
    the pump removes fluid from the enclosure in response to a signal that corresponds with the deformation of the enclosure due to the object being placed on the enclosure.

11. The system of claim 6, further comprising a second enclosure having an outer surface and an inner surface, wherein the second enclosure contains a plurality of jamming members and is capable of sealing a fluid contained within the second enclosure from an outside atmosphere, wherein at least a portion of the outer surface of the second enclosure overlaps at least a portion of the outer surface of the first enclosure.

12. The system of claim 6, wherein the first enclosure forms an internal surface of the vehicle.

13. A vehicle having a cargo retaining system, the cargo retaining system comprising:
    a fluid pump;
    a first enclosure either forming a surface within the vehicle or rigidly mounted to a surface of the vehicle and having an outer surface and an inner surface, wherein the first enclosure is capable of containing a fluid provided by the fluid pump;
    a plurality of jamming members within the first enclosure; and
    an opening in fluid communication with the pump for receiving or removing the fluid provided by the pump, wherein the plurality of jamming members are moveable relative to one another within the first enclosure when fluid is received via the opening allowing the outer surface of the first enclosure to be deformable; and wherein the plurality of jamming members are restricted from movement relative to one another within the first enclosure when fluid is removed via the opening causing the outer surface of the first enclosure to maintain a semi-rigid or rigid state.

14. The system of claim 13, wherein the plurality of jamming members are a granular media.

15. The system of claim 13, wherein the plurality of jamming members are a series of sheets forming layers within the first enclosure.

16. The system of claim 13, further comprising a pump for removing or providing fluid to the first enclosure via the opening.

17. The system of claim 16, wherein the pump adds fluid to the enclosure in response to a signal that corresponds with an object being placed on a surface of the enclosure; and
the pump removes fluid from the enclosure in response to a signal that corresponds with the deformation of the enclosure due to the object being placed on the enclosure.

18. The system of claim 17, wherein the pump adds fluid to the enclosure in response to a signal that corresponds with the object being removed from a surface of the enclosure; and
The pump removes fluid from the enclosure in response to a signal that corresponds with the enclosure returning to a default state.

19. The system of claim 13, further comprising a second enclosure having an outer surface and an inner surface, wherein the second enclosure contains a plurality of jamming members and is capable of containing a fluid within the second enclosure from an outside atmosphere, wherein at least a portion of the outer surface of the second enclosure overlaps at least a portion of the outer surface of the first enclosure.

20. The system of claim 13, wherein the first enclosure forms an internal surface of the vehicle.

* * * * *